United States Patent

[11] 3,618,568

| [72] | Inventor | Earl W. Breeden |
| | | 832 Grayson Ave., Waynesboro, Va. 22980 |
| [21] | Appl. No. | 17,224 |
| [22] | Filed | Mar. 6, 1970 |
| [45] | Patented | Nov. 9, 1971 |

[54] PET HOUSE
5 Claims, 7 Drawing Figs.

[52] U.S. Cl. ........................................................ 119/19, 119/15, 119/1
[51] Int. Cl. ........................................................ A01k 01/00, A01k 67/00
[50] Field of Search ........................................... 119/1, 15, 19

[56] References Cited
UNITED STATES PATENTS

| 1,051,784 | 1/1913 | Trewhitt | 119/19 |
| 1,532,486 | 4/1925 | Harrington | 119/19 |
| 2,821,165 | 1/1958 | Wright | 119/15 |
| 2,897,781 | 8/1959 | Olson | 119/19 |
| 3,173,398 | 3/1965 | Raymond | 119/1 |
| 3,195,506 | 7/1965 | Beard | 119/19 |
| 3,310,031 | 3/1967 | Lowe, Jr. | 119/1 |

*Primary Examiner*—Aldrich F. Medbery
*Attorney*—Auzville Jackson, Jr.

ABSTRACT: Pet house in the form of an attractive piece of furniture which can be readily opened to a pet house usable in a person's living quarters.

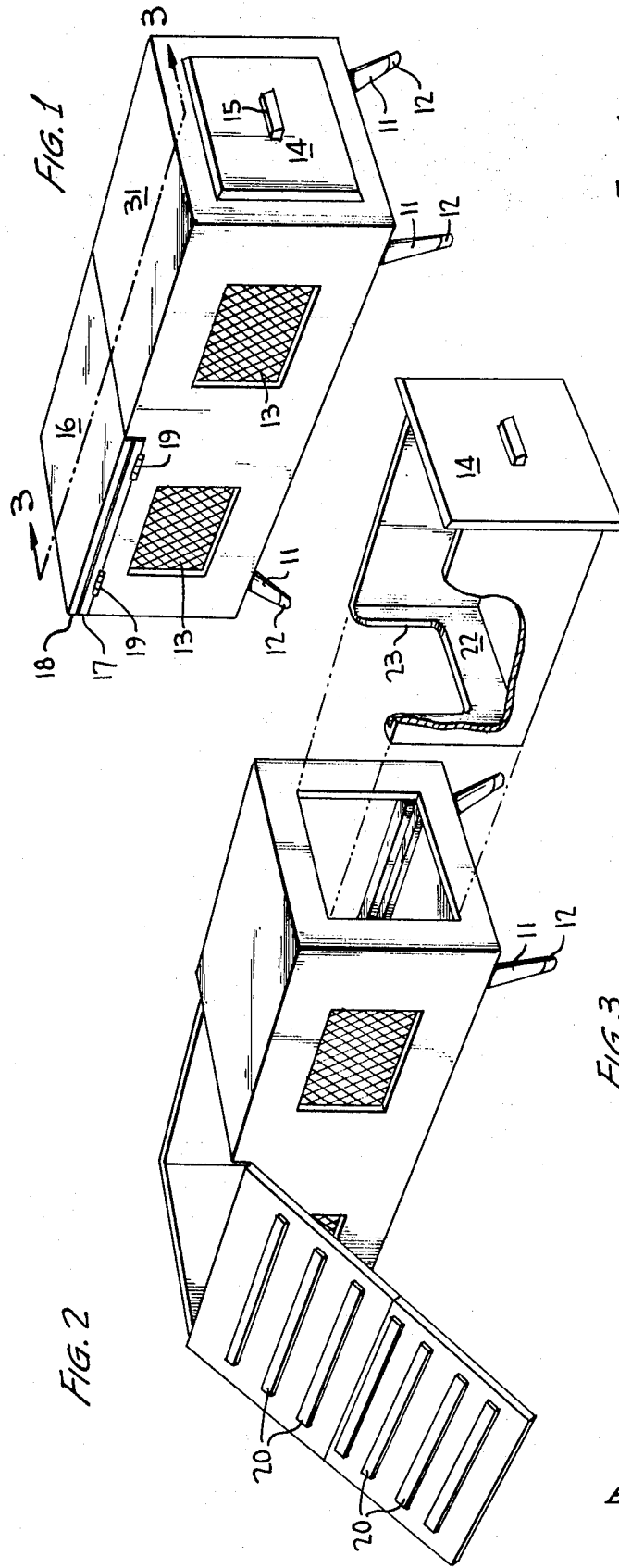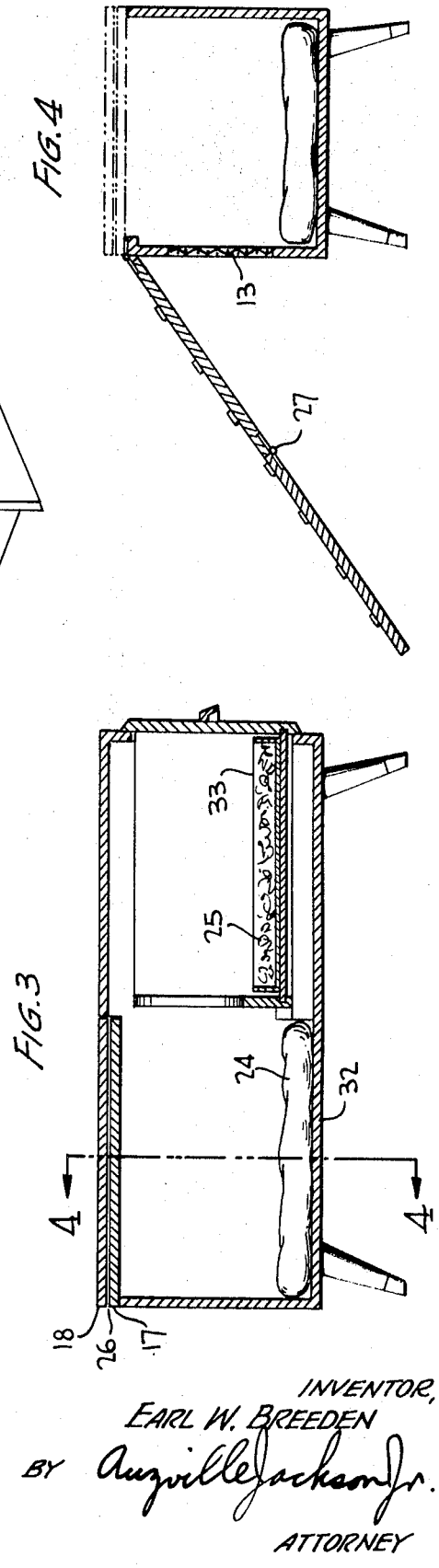

PATENTED NOV 9 1971

INVENTOR,
EARL W. BREEDEN
BY Auzville Jackson Jr.
ATTORNEY

PET HOUSE

BACKGROUND OF THE INVENTION

1. Field of the Invention

The present invention relates to a pet house which is usable for cats and dogs and the like in the personal living quarters of the owner or caretaker. The house is in the form of a piece of furniture which is sufficiently attractive for daytime use with other furniture and opened when desired to the pet house by unfolding a side or the top into a ramp which the pet may use to enter the sleeping compartment of the house. Ventilation holes are provided and the pet's sleeping compartment may have an adjacent litter compartment.

2. Description of the Prior Art

Usually pets are accommodated in the owner's or caretaker's living quarters, if they are tolerated in the living quarters at all, by a sleeping basket usually placed at some remote location so that it will not be tripped over or otherwise form an obstruction to the passage of the human occupant of the living quarters. They are single-purpose items and usually are unattractive so that the owner prefers that they be out of sight. They are provided as a rule with pillows or other bedding material. In addition, sometimes litter baskets or trays separate from the bedding arrangement have been suggested for use.

SUMMARY OF THE INVENTION

In accordance with the present invention, a unique pet house is provided that has the dual function of a piece of furniture, attractive enough that it can be placed in any part of the living quarters of the human owner but may be readily converted to an attractive pet house by either lowering a side or unfolding the top to provide a ramp for the pet to enter. The floor of the pet house has bedding material placed therein to provide a comfortable-bedding arrangement for the pet and the surrounding walls provide a feeling of security so that the pet can sleep without disturbance. The pet house is provided with vents so that it can be constantly aired and may be provided with a sliding drawer litter compartment or similar arrangement housing a litter-catching material. The litter compartment has an inside entrance so that the pet can enter the "litter compartment" without leaving the pet house and at the same time eliminate an exposed outside unattractive opening. The sliding drawer permits the litter to be removed and discarded at the convenience of the owner and prevents the objectionable litter from visually intruding into the living quarters.

Many objects and advantages of the present invention will become apparent from the following description taken in connection with the accompanying drawings.

BRIEF DESCRIPTION OF THE DRAWINGS

FIG. 1 shows a perspective view of one embodiment of the pet house;

FIG. 2 shows a perspective view of FIG. 1 with the litter drawer exploded outwardly and the ramp in the down position;

FIG. 3 is a cross-sectional view taken along section 3—3 of FIG. 1;

FIG. 4 is a cross-sectional view taken along section 4—4 of FIG. 3 but with the ramp in the down position;

DESCRIPTION OF THE INVENTION

Figure 5:
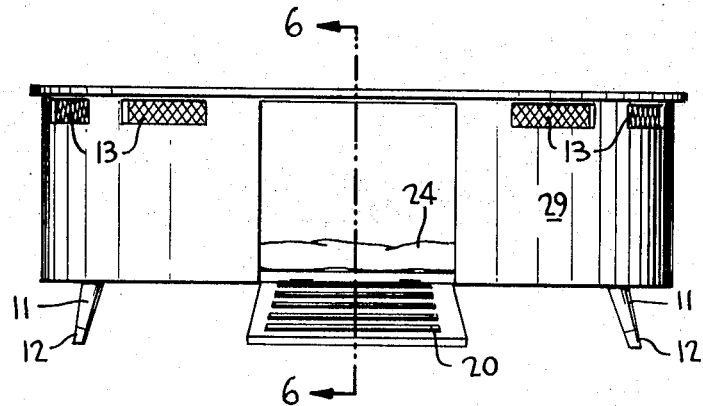
FIG. 5 is a front view of another embodiment of the pet house with the ramp in the down position.

With reference to FIG. 1 the pet house is shown in a first embodiment as a piece of rectangular furniture having four legs 11 with feet 12 on the end thereof so as to elevate the bottom portion or floor of the pet house above the floor of the room in which it is sitting. Such legs could be solid and extend around the entire periphery of the pet house provided the pet house floor is elevated above the floor of the room upon which it rests. Two ventilation holes 13 are provided for purposes of permitting airing of the inside of the pet house even when it is in its closed position. At one end or side of the house is provided a drawer 14 with handle 15 to enable it to be readily withdrawn from the house. The portion of the house over the drawer is a first flat tabletop section 31 maintained in a fixed position and flush with the tabletop section 31 and forming an extension thereof at the opposite end is a hinged lid 16 formed of a lower part 17 and an upper part 18. The lower part is hinged to the pet house by two hinges 19.

As seen in FIG. 2 when the hinged lid is rotated to the open position it forms a ramp which reaches to the floor at an acute angle permitting the pet to walk up the ramp and jump into the pet house or else walk up the ramp and jump onto the flat fixed portion 31 of the tabletop where it may rest, look out the window, or otherwise enjoy itself. The ramp is provided with a series of steps cleats or antislip means 20 to make it easier for the pet to climb the ramp.

The drawer 14 has two sides 21 which are substantially the height of the drawer and an end 22 cut away at 23 so that the pet may enter the drawer from inside the pet house when the drawer is in its closed position.

As best seen in FIG. 3 the pet house is divided into two compartments, the left compartment having a bedding material 24 resting on the floor 32 and the right compartment containing litter material 25 resting in a shallow pan or tray 33 at the bottom of the litter drawer. Thus the pet can jump from the bedroom portion of the pet house through the slot or end cut 23 into the bathroom portion so that its litter can be caught by the litter material. Since the end cut of slot 23 still leaves a substantial portion of the drawer end 22 intact, it to some extent forms a wall between the two parts of the pet house. It is also seen that both the bedding and litter arrangements are clearly above the floor of the room in which the pet house is placed. Also as seen in FIG. 3, a space 26 is located between the lower part of the lid 17 and the upper part of the lid 18 so as to accommodate the end steps 20.

FIG. 4 taken along section 4—4 of FIG. 3 clearly shows the ventilation hole 13 having a suitable decorative mesh placed therein. It also shows the ramp in its lowered extended position held in a straight extended manner by hinge 27.

Figure 6:
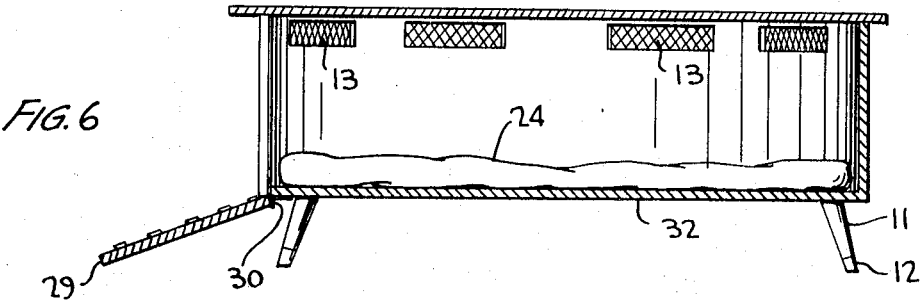
FIG. 6 is a sectional side view of FIG. 5 taken along section 6—6.
Figure 7:
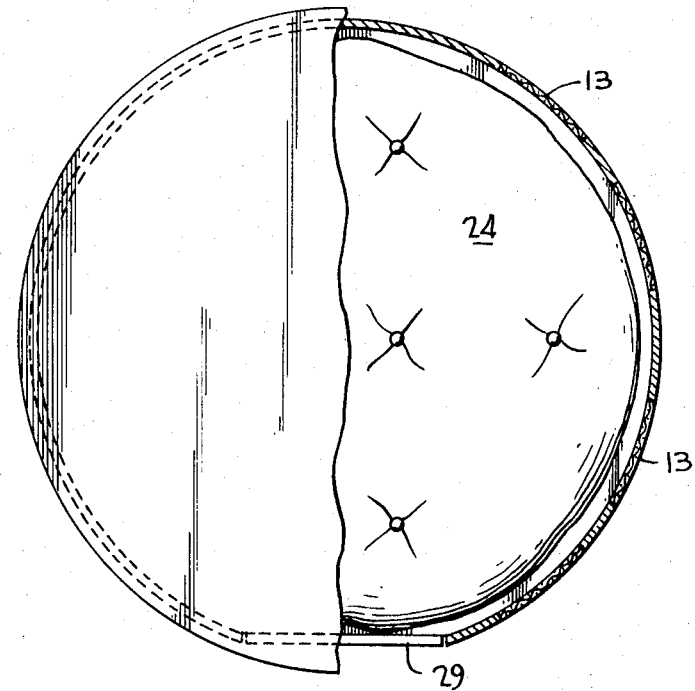
FIG. 7 is a top view with a portion broken away of FIG. 5 with the ramp in the up position.

In FIGS. 5, 6, and 7 is shown a second embodiment of the pet house which has legs 11 with feet 12. The circular house shown has a series of small ventilation holes 13 having decorative mesh thereover placed just beneath the flat circular top 28. This top would normally not be open but may be provided with an arrangement (not shown) where it can be removed to change the bedding and clean the pet house when such is desired by the owner. The height of the pet house shown is of the conventional height of a standard coffee table and again the floor 32 of the pet house is elevated above the floor of the room in which it is present. The sides 29 of the pet house are made of a suitable decorative furniturelike material such as wood, plastic, and similar materials. In the second embodiment the ramp in its closed position forms a portion of the sidewall rather thin the top of the pet house. Again, the ramp may have several steps cleats or antislip means 20 thereupon to make it easy for the pet to climb the ramp to enter the house and bed down for the night. Inside the house is a suitable bedding material 24 which usually consists merely of a thin flat pillow or pad.

As best seen in FIG. 6, which is a section taken along section 6—6 of FIG. 5, the ramp 29 is hinged to the pet house by hinge 30. When it is raised to its up position a latch (not shown) holds it in that position until released.

FIG. 7 is a top or plan view of FIGS. 5 and 6 and shows the ramp 29 in its upward position as well as showing a better view of the circular shape of the pet house and the circular shape of the pillowlike bedding material.

It can be readily appreciated after considering the foregoing description of the invention that an attractive piece of furniture is provided that is sufficiently attractive to be placed almost any place of the living quarters of a home or an apartment but is convertible for use as a pet house for a dog or cat or the like that will provide a feeling of security and may also provide a litter compartment that can be entered from the bedding from the bedding compartment of the house. Since utilization of living quarters is becoming more and more of a problem as society becomes more urbanized, the pet house described fulfills an increasing and important need. This is especially true since the pet baskets and similar devices used in the past have been both eyesores and nuisances and unless placed in remote corners constitute hazards which may be tripped over or kicked accidentally by people walking through the room.

While two embodiments of the invention have been specifically described, the invention may be embodied in numerous other forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of the equivalency of the claims are therefore intended to be embraced therein.

What is claimed is:

1. A pet house in the form of a piece of furniture comprising an outer surface having a flat top and sidewall, at least a portion of the said top outer surface pivotally mounted on a sidewall so as to form a ramp when in the open and down position and to form a closure when in the closed and up position said ramp having at least two hinged portions and when extended being of a length substantially exceeding the height of said house from the floor to said pivotal sidewall mount, a floor including a bedding compartment for the pet, leg means for disposing said floor and bedding compartment in an elevated position; and ventilation means permitting air to enter and exit from the interior of said house when the ramp portion is in a closed position.

2. A pet house as defined in claim 1 wherein said portion of said flat top forming said ramp includes antislip means portion.

3. A pet house as defined in claim 1 wherein
 a drawer means removable from a side of said pet house which underlies the said fixed portion of said flat top, said drawer means defining a litter compartment having an inner end wall at least partially cut away so that the pet can enter the litter compartment from said bedding compartment without leaving the pet house, and a tray for receiving litter material located in the bottom of said drawer means.

4. A pet house as defined in claim 1 wherein:
 a litter compartment is located adjacent said bedding compartment,
 a separating wall between said litter compartment and said bedding compartment,
 an opening in said separating wall to permit the pet to enter the litter compartment from the bedding compartment without leaving the pet house; and
 a litter receiving means located in the bottom of said litter compartment to receive litter material.

5. A pet house as defined in claim 4 wherein said litter receiving means is removable form the side of said pet house.

* * * * *